US009122675B1

(12) United States Patent
Schanbacher

(10) Patent No.: US 9,122,675 B1
(45) Date of Patent: *Sep. 1, 2015

(54) PROCESSING NATURAL LANGUAGE GRAMMAR

(71) Applicant: West Corporation, Omaha, NE (US)

(72) Inventor: Steven John Schanbacher, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/324,943

(22) Filed: Jul. 7, 2014

Related U.S. Application Data

(63) Continuation of application No. 14/171,942, filed on Feb. 4, 2014, now Pat. No. 8,805,677, which is a continuation of application No. 12/703,435, filed on Feb. 10, 2010, now Pat. No. 8,666,729.

(51) Int. Cl.
| | |
|---|---|
| *G06F 17/27* | (2006.01) |
| *G06F 17/28* | (2006.01) |
| *G06F 17/21* | (2006.01) |
| *G10L 21/00* | (2013.01) |
| *G10L 15/04* | (2013.01) |
| *G10L 15/26* | (2006.01) |
| *G10L 17/00* | (2013.01) |

(52) U.S. Cl.
CPC ...................................... *G06F 17/28* (2013.01)

(58) Field of Classification Search
USPC ........ 704/4, 5, 6, 9, 10, 270, 270.1, 275, 251, 704/252, 253, 254
See application file for complete search history.

(56) References Cited

U.S. PATENT DOCUMENTS

| | | | | |
|---|---|---|---|---|
| 5,974,413 | A * | 10/1999 | Beauregard et al. | ................... 1/1 |
| 6,052,657 | A | 4/2000 | Yamron et al. | |
| 6,374,210 | B1 | 4/2002 | Chu | |
| 6,438,545 | B1 * | 8/2002 | Beauregard et al. | ................... 1/1 |
| 6,983,239 | B1 | 1/2006 | Epstein | |
| 6,985,851 | B2 | 1/2006 | Weise et al. | |
| 7,107,522 | B1 * | 9/2006 | Morgan et al. | ................ 715/201 |
| 7,111,235 | B1 * | 9/2006 | Morgan et al. | ................ 715/201 |
| 7,124,362 | B2 * | 10/2006 | Tischer | ......................... 715/255 |
| 7,269,664 | B2 * | 9/2007 | Hutsch et al. | ................ 709/246 |
| 7,353,176 | B1 * | 4/2008 | Baray et al. | ................ 704/275 |
| 7,434,176 | B1 * | 10/2008 | Froloff | ........................ 715/839 |
| 7,493,251 | B2 | 2/2009 | Gao et al. | |
| 7,536,711 | B2 * | 5/2009 | Miyashita et al. | ................. 726/3 |
| 7,546,334 | B2 * | 6/2009 | Redlich et al. | ................ 709/201 |
| 7,552,116 | B2 | 6/2009 | Chang et al. | |
| 7,610,191 | B2 | 10/2009 | Gao et al. | |
| 7,725,923 | B2 * | 5/2010 | Miyashita et al. | ................. 726/1 |
| 7,788,265 | B2 * | 8/2010 | Morscher et al. | ............. 707/740 |
| 7,822,598 | B2 | 10/2010 | Carus et al. | |
| 7,921,360 | B1 * | 4/2011 | Sundermeyer et al. | ........ 715/255 |
| 7,991,608 | B2 * | 8/2011 | Johnson et al. | ................... 704/9 |
| 8,311,795 | B2 | 11/2012 | Arning et al. | |

(Continued)

*Primary Examiner* — Edgar Guerra-Erazo

(57) ABSTRACT

Creating and processing a natural language grammar set of data based on an input text string are disclosed. The method may include tagging the input text string, and examining, via a processor, the input text string for at least one first set of substitutions based on content of the input text string. The method may also include determining whether the input text string is a substring of a previously tagged input text string by comparing the input text string to a previously tagged input text string, such that the substring determination operation determines whether the input text string is wholly included in the previously tagged input text string.

20 Claims, 2 Drawing Sheets

(56) References Cited

U.S. PATENT DOCUMENTS

| | | |
|---|---|---|
| 2002/0046018 A1 | 4/2002 | Marcu et al. |
| 2002/0138248 A1 | 9/2002 | Corston-Oliver et al. |
| 2003/0061027 A1 | 3/2003 | Weise et al. |
| 2003/0130837 A1 | 7/2003 | Batchilo et al. |
| 2003/0139921 A1 | 7/2003 | Byrd et al. |
| 2005/0060140 A1 | 3/2005 | Maddox |
| 2005/0192792 A1 | 9/2005 | Carus et al. |
| 2006/0074634 A1 | 4/2006 | Gao et al. |
| 2006/0259345 A1 | 11/2006 | Stetina |
| 2007/0073678 A1* | 3/2007 | Scott et al. ............ 707/5 |
| 2007/0073745 A1* | 3/2007 | Scott et al. ............ 707/100 |
| 2007/0162275 A1 | 7/2007 | Ablondi et al. |
| 2007/0179776 A1 | 8/2007 | Segond et al. |
| 2007/0185702 A1 | 8/2007 | Harney et al. |
| 2007/0203688 A1 | 8/2007 | Fuji et al. |
| 2008/0033714 A1 | 2/2008 | Gupta |
| 2008/0275694 A1 | 11/2008 | Varone |
| 2009/0083034 A1 | 3/2009 | Hernandez et al. |
| 2009/0157385 A1* | 6/2009 | Tian ............ 704/9 |
| 2010/0010804 A1 | 1/2010 | Friedman et al. |
| 2010/0211379 A1* | 8/2010 | Gorman et al. ............ 704/9 |
| 2011/0301941 A1* | 12/2011 | De Vocht ............ 704/9 |

* cited by examiner

PROCESSING NATURAL LANGUAGE GRAMMAR

CROSS REFERENCE TO RELATED APPLICATIONS

The present application is a continuation from U.S. patent application Ser. No. 14/171,942, filed Feb. 4, 2014, and entitled "PROCESSING NATURAL LANGUAGE GRAMMAR", which is a continuation from U.S. patent application Ser. No. 12/703,435, filed Feb. 10, 2010, and entitled "PROCESSING NATURAL LANGUAGE GRAMMAR", which is related to U.S. patent application Ser. No. 12/107,119, filed Apr. 22, 2008 and titled AUTOMATIC SPEECH TAGGING SYSTEM AND METHOD THEREOF, the entire contents of which are incorporated by reference herein.

TECHNICAL FIELD OF THE INVENTION

This invention relates to a method, apparatus and computer readable storage medium for processing a natural language grammar, and, more particularly, a natural language grammar set of data that is based on a plurality of input text strings.

BACKGROUND OF THE INVENTION

Speech recognition technologies permit a user to interface with a computerized system using spoken language. Speech recognition technology receives spoken input from the user, interprets the input, and then translates the input into a form that the computer system understands. More particularly, spoken input in the form of an analog waveform voice signal is digitally sampled. The digital samples are then processed by the speech recognition system according to a speech recognition algorithm.

Speech recognition systems typically recognize and identify words or utterances of the spoken input by comparison to previously obtained templates of words or utterances or by comparison to a previously obtained acoustic model of a person who is speaking. The templates and acoustic model are typically generated based upon samples of speech.

An example of a known speech recognition technique is known as word-level template string matching. During word-level template string matching, the spoken input signal is compared to pre-stored template strings which represent various words and phrases. Generally, a template which most closely matches the spoken input is selected as the output.

Another example of a known speech recognition technique is acoustic-phonetic recognition. According to acoustic-phonetic recognition, the spoken input signal is segmented and identified according to basic units of speech sound known as phonemes. The results of segmentation and identification are then compared to a pre-stored vocabulary of words. The word or words which most closely match the spoken input are selected as the output.

Yet another example of a known speech recognition technique is stochastic speech recognition. According to stochastic speech recognition, the spoken input is converted into a series of parameter values which are compared to pre-stored models. For example, the pre-stored models can be based on probabilities. In operation, samples of spoken words or sentences are received and then represented as parameter values which take into account statistical variation between different samples of the same phoneme. Probabilistic analysis is utilized to obtain a best match for the spoken input. Known algorithms for probabilistic analysis are the Baum-Welch maximum likelihood algorithm and the Viterbi algorithm.

Major considerations for such speech recognition processes are processing speeds and overall speech recognition accuracy. One of the common processes associated with speech recognition is building a natural language (NL) grammar vocabulary that can be used to ultimately represent the user's speech input. Building a NL grammar vocabulary from tagged data can be a burdensome process. It typically takes a human several weeks to complete an entire language grammar vocabulary by hand. Developing a NL grammar vocabulary engine that performs at real-time or near real-time speed, and that maintains a level of accuracy comparable to a human performing a NL grammar vocabulary would increase the likelihood of acceptance by users of such voice recognition systems.

SUMMARY OF THE INVENTION

One embodiment of the present invention may include a method of creating a natural language grammar set of data based on an input text string. The method may include tagging the input text string, and examining, via a processor, the input text string for at least one first set of substitutions based on content of the input text string. The method may also include determining whether the input text string is a substring of a previously tagged input text string by comparing the input text string to a previously tagged input text string, such that the substring determination operation determines whether the input text string is wholly included in the previously tagged input text string.

Another embodiment of the present invention may include an apparatus configured to create a natural language grammar set of data based on an input text string. The apparatus may include a processor configured to tag the input text string, and to examine the input text string for at least one first set of substitutions based on content of the input text string. The processor is further configured to determine whether the input text string is a substring of a previously tagged input text string by comparing the input text string to a previously tagged input text string, such that the substring determination operation determines whether the input text string is wholly included in the previously tagged input text string.

DETAILED DESCRIPTION OF THE INVENTION

Figure 1:
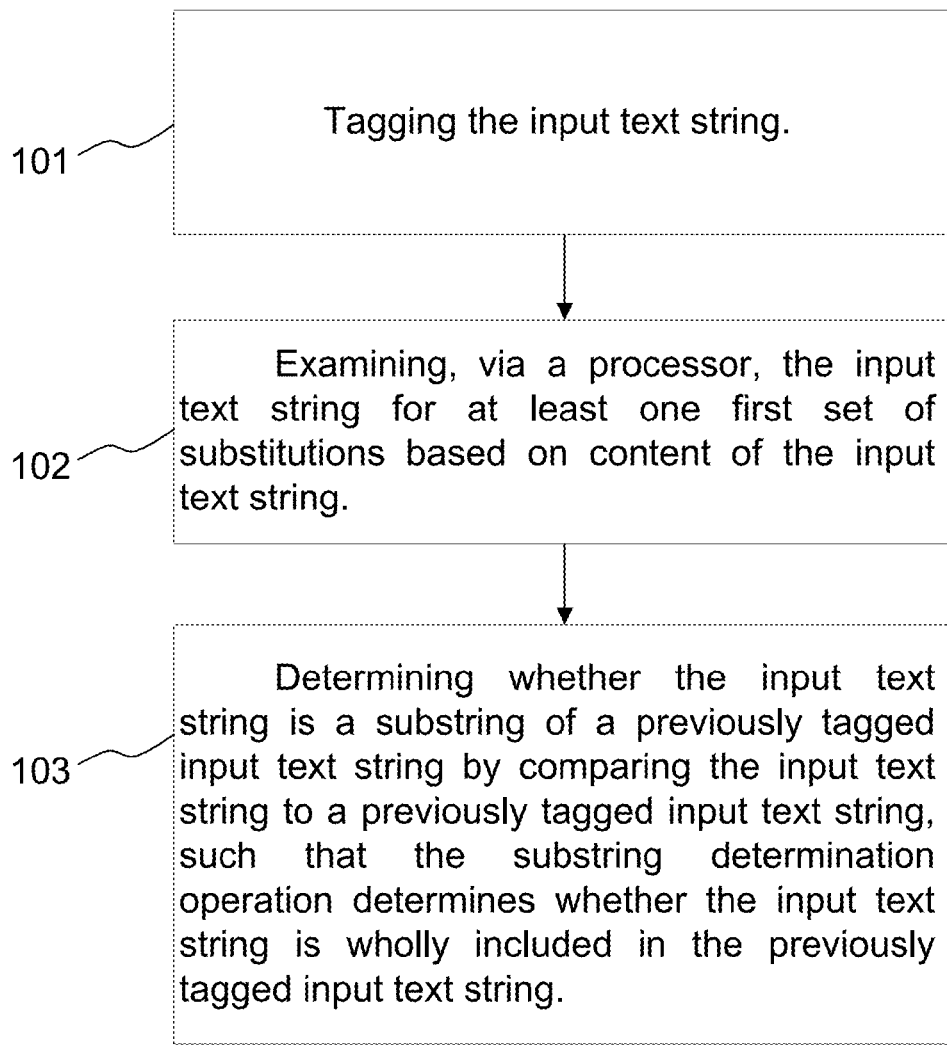
FIG. 1 illustrates an example method according to an example embodiment of the present invention.

It will be readily understood that the components of the present invention, as generally described and illustrated in the figures herein, may be arranged and designed in a wide variety of different configurations. Thus, the following detailed description of the embodiments of a method, apparatus, and computer program and/or system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Creating and deploying natural language (NL) grammar to be used in a natural language processing algorithm can be costly and time-consuming. Automating the process of NL grammar creation could increase the popularity of such algorithms, as every stage of the product cycle could be controlled via the web or via an automated processing engine.

Given a tagging strategy, a prototype grammar writing program that was capable of writing an NL grammar with 80% accuracy in 20 seconds has a chance at success based on its practicality. Ideally, increasingly higher percentages in accuracy would be optimal, however, 80% at 20 seconds processing demonstrates the potential to create more accurate NL grammar sets in a short period of time. It is well established that having a human create the grammar is too slow, and, although fairly accurate, a time frame of weeks is not feasible for a product strategy.

A rapid turn around time of 20 seconds, coupled with a data management system, should allow automated NL solutions to achieve near human written performance in a very short period of time. An NL grammar set might achieve a first round accuracy of 80%, but over the course of the first day, it might be updated multiple times ending the first day at 85% accuracy.

Example embodiments of the present invention implement a program that accepts a set of tagged data strings as input. The first operation of the program may be to expand the set of input strings, if desired. The program may use a set of common substitutions. For example, a string may contain a word that is subject to any of a plurality of common language substitutions. The program may ensure that all possible variants of the string exist and creating them if they do not already exist. For example, the "my" in the string "pay my bill" would be noted by the program. The program would create the additional strings "pay our bill", "pay a bill", "pay the bill", "pay bill", etc. The program would then loop through the strings in a sorted order The sorted order may be sorted by length from longest to shortest, then again sorted alphabetically. As the program processes a tagged string, it checks to see if that tagged string is a substring of a previous tagged string. The substring may be considered a portion of a larger string, such that the substring is wholly contained in the content of the larger string. If the present input string is a substring of a previously tagged string, the programs checks to see if both strings have the same tag. If both strings have the same tag, the program notes that there is no reason for the longer string to be part of the interpretation grammar, because the shorter string will provide coverage for the longer string. If the two strings have different tags, then the script notes that the longer string will need to be written, as is, in the interpretation grammar to ensure that the shorter string will not interfere with the independent content of the longer string in the completed grammar. After all of the strings have been processed, the program writes compilation grammar source code to a file.

Referring to the program operations, the program goes through the tagged strings by length from longest to shortest, comparing each string with all of the strings shorter than itself from longest to shortest. The program will stop when it finds the longest shorter string that is an exact substring that is wholly contained in the longer string. If the shorter string shares the same tag as the longer string, the script counts on the shorter string being able to tag the longer string correctly. For example, a comment is made in the grammar. If the shorter string has a different tag than the longer string, then the whole longer string is put in the interpretation grammar to ensure it gets the correct tag and the program keeps going without eliminating the longer string from the grammar.

One example of strings that share a common tag may be denoted by strings "mailing address" and "address" being the only strings tagged as "ADDRESS_AMBIG." In this example, the script wrote the grammar as: ADDRESS_AMBIG [(address); "mailing address", so that the tag "ADDRESS_AMBIG" identifies both the strings "mailing address" and "address."

Below is a sample run of the various strings being compared and ultimately some strings being eliminated due to even smaller strings or substrings being present (See Table 1). The numbering scheme simply represents lines of code increasing in number.

Table 1

1/1157 "i'd like to place an order and i'd like to return an item"
2/1157 "i'd like to speak with a customer service representative"→"customer service representative"
3/1157 "i need to speak with a customer service representative"→"customer service representative"
4/1157 "i'd like to speak to a customer service representative"→"customer service representative"
5/1157 "i need to speak to a customer service representative"→"i need to speak to a customer service"
6/1157 "i need to talk to a customer service representative"→"customer service representative"
7/1157 "i need to speak to someone in customer service"→"i need to speak to someone"
8/1157 "i need to speak with a customer representative"→"customer representative"
9/1157 "i'd like to speak to a customer representative"→"customer representative"
10/1157 "i'd like to replace i'd like to place an order"→"replace i'd like to place an order"
11/1157 "i'd like to place an order and return an item"→"place an order and return an item"
12/1157 "i need to talk to someone in customer service"→"i need to talk to someone"
13/1157 "i'd like to talk to a customer representative"→"customer representative"
14/1157 "i need to speak to a customer representative"→"customer representative"
15/1157 "i'd like to speak to a representative please"→"i'd like to speak to a representative"
16/1157 "i need to return an item and place an order"→"return an item and place an order"
17/1157 "i need to place an order and return an item"→"place an order and return an item"
18/1157 "i need to speak with a customer service rep"→"customer service rep"
19/1157 "i need to speak to a representative please"→"i need to speak to a representative"
20/1157 "i want to speak to a representative please"→"i want to speak to a representative"
21/1157 "place an order i'd like to place an order"→"an order i'd like to place an order"
22/1157 "i need to check on the status of an order"→"check on the status of an order"
23/1157 "i need to speak to a customer service rep"→"i need to speak to a customer service"

24/1157 "i would like to speak to a representative"→"like to speak to a representative"
25/1157 "i need to speak to a sales representative"→"sales representative"
26/1157 "i need help with an order on the internet"
27/1157 "i'd like to check the status of an order"→"check the status of an order"
28/1157 "i need to talk to a customer service rep"→"customer service rep"
29/1157 "i'd like to place an order with a person"
30/1157 "i need to talk to someone about an order"
31/1157 "i'd like to speak with a representative"→"speak with a representative"
32/1157 "i need to talk to someone about an item"
33/1157 "i'd like to speak with customer service"→"customer service"
34/1157 "i need to check the status of an order"→"check the status of an order"
35/1157 "i'd like to i'd like to place an order"→"i'd like to place an order"
36/1157 "i would like to talk to representative"→"talk to representative"
37/1157 "i need to check the status of my order"→"status of my order"
38/1157 "i would like to place an order please"→"i would like to place an order"
39/1157 "i need to speak with a representative"→"speak with a representative"
40/1157 "i'd like to speak to a representative"→"like to speak to a representative"
41/1157 "i need to speak with customer service"→"customer service"
42/1157 "uh i need to talk to a representative"→"i need to talk to a representative"
43/1157 "i need to speak to a customer service"→"customer service"
44/1157 "i need to speak to an account manager"
45/1157 "i need to set up a government account."

As may be observed from Table 1, the input text strings on the left of the arrow→are compared to previous text strings on the right of the arrow. When a substring is matched as being wholly part of the larger input string, the comparison provides a replacement by the smaller substring. Line 5 is bolded as the string "I need to speak to a customer service representative" is replaced with "I need to speak to a customer service." A similar occurrence is present at line 23 which is also bolded, except the "rep" word has been used as a replacement for "representative." An ever further substring replacement operation is shown at line 43 where "customer service" has been used as an even newer and shorter replacement substring.

As may be observed from Table 1, the substrings are used to replace longer input strings and to generate source code that includes the defined NL grammar that will be used to generate strings of words from other alternative strings of words. Such a procedure provides a language rule generator that can be used to match input from a spoken individual to a machine defined term or phrase. The end result is a satisfactory outcome from the user's spoken input, such as, "customer service representative" being interpreted as "customer service" which may in turn be used as a parameter to connect a caller with the correct department.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 2 illustrates an example network element 200, which may represent any of a variety of different processing platforms used to execute the program described above.

Figure 2:
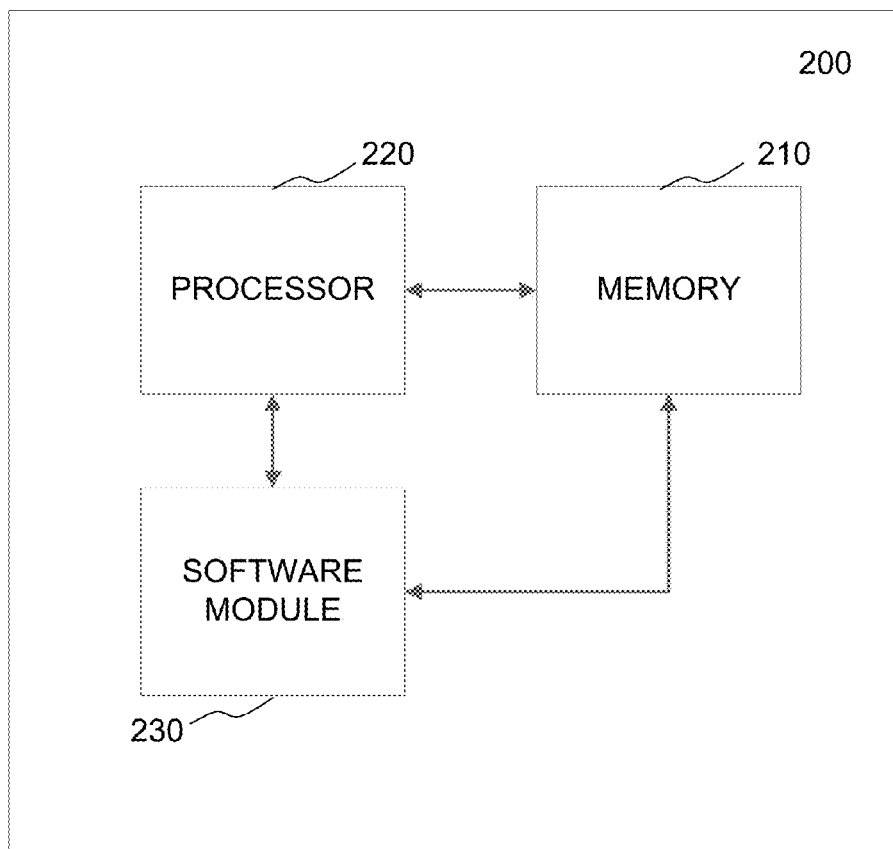
FIG. 2 illustrates an example apparatus according to example embodiments of the present invention.

As illustrated in FIG. 2, a memory 210 and a processor 220 may be discrete components of the network entity 200 that are used to execute an application or set of operations. The application may be coded in software in a computer language understood by the processor 220, and stored in a computer readable medium, such as, the memory 210. Furthermore, a software module 230 may be another discrete entity that is part of the network entity 200, and which contains software instructions that may be executed by the processor 220. In addition to the above noted components of the network entity 200, the network entity 200 may also have a transmitter and receiver pair configured to receive and transmit communication signals (not shown).

One example embodiment of the present invention may include a method of creating a natural language grammar set of data based on an input text string. The method may include tagging the input text string at operation 101. The method may also include examining, via a processor, the input text string for at least one first set of substitutions based on content of the input text string at operation 102. The method may further include determining whether the input text string is a substring of a previously tagged input text string by comparing the input text string to a previously tagged input text string, such that the substring determination operation determines whether the input text string is wholly included in the previously tagged input text string at operation 103.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   examining, via a processor, a tagged input text string for at least one first set of substitutions based on content of the input text string;
   determining the input text string is a substring of a previously tagged input text string;
   determining the input text string and at least one additional input text string share a common pre-assigned tag identifier stored in a memory location; and
   eliminating at least one of the input text string and the at least one additional input text string from a natural language grammar.

2. The method of claim 1, further comprising:
   performing the at least one first set of substitutions by expanding the input text string to create at least one additional input text string that includes at least one portion of the input text string and at least one additional portion not previously part of the input text string.

3. The method of claim 2, wherein each of the at least one additional input text string contains words that are the same as the input text string except at least one word has been removed from the input text string and has been replaced by a different word in the at least one additional input text string.

4. The method of claim 1, wherein eliminating at least one of the input text string and the at least one additional input text string from the natural language grammar comprises determining which comprises a longer input text string and eliminating that which is a longer input text string among the input text string and the at least one additional input text string.

5. The method of claim 1, wherein if the input text string and the at least one additional input text string do not share a common pre-assigned tag identifier stored in the memory location, then maintaining the input text string and the at least one additional input text string in the natural language grammar by writing both the input text string and at least one additional input text string to a source code stored in the memory location.

6. The method of claim 1, wherein the input text string is a plurality of text strings each of which are examined, via the processor for the at least one first set of substitutions based on content of the additional input text strings, and wherein at least one of the plurality of input text strings are used to generate a grammar source code file.

7. An apparatus, comprising:
   a processor configured to
      examine a tagged input text string for at least one first set of substitutions based on content of the input text string,
      determine the input text string is a substring of a previously tagged input text string, determine the input text string and at least one additional input text string share a common pre-assigned tag identifier stored in a memory location, and
      eliminate at least one of the input text string and the at least one additional input text string from a natural language grammar.

8. The apparatus of claim 7, wherein the processor is further configured to perform the at least one first set of substitutions by expanding the input text string to create at least one additional input text string that includes at least one portion of the input text string and at least one additional portion not previously part of the input text string.

9. The apparatus of claim 8, wherein each of the at least one additional input text string contains words that are the same as the input text string except at least one word has been removed from the input text string and has been replaced by a different word in the at least one additional input text string.

10. The apparatus of claim 7, further comprising:
    a memory location configured to store a pre-assigned tag identifier.

11. The apparatus of claim 10, wherein eliminating at least one of the input text string and the at least one additional input text string from the natural language grammar comprises determining which is a longer input text string and eliminating that which is a longer input text string among the input text string and the at least one additional input text string.

12. The apparatus of claim 10, wherein if the input text string and the at least one additional input text string do not share a common pre-assigned tag identifier stored in the memory location, then maintaining the input text string and the at least one additional input text string in the natural language grammar by writing both the input text string and at least one additional input text string to a source code stored in the memory location.

13. The apparatus of claim 7, wherein the input text string is a plurality of text strings each of which are examined, via the processor for the at least one first set of substitutions based on content of the additional input text strings, and wherein at least one of the plurality of input text strings are used to generate a grammar source code file.

14. A non-transitory computer readable storage medium configured to store a set of instructions that when executed causes a processor to perform:
    examining a tagged input text string for at least one first set of substitutions based on content of the input text string;
    determining the input text string is a substring of a previously tagged input text string;
    determining the input text string and the at least one additional input text string share the common pre-assigned tag identifier stored in a memory location; and
    eliminating at least one of the input text string and the at least one additional input text string from a natural language grammar.

15. The non-transitory computer readable storage medium of claim 14, wherein the processor is further configured to perform:
    the at least one first set of substitutions by expanding the input text string to create at least one additional input text string that includes at least one portion of the input text string and at least one additional portion not previously part of the input text string.

16. The non-transitory computer readable storage medium of claim 15, wherein each of the at least one additional input text string contains words that are the same as the input text string except at least one word has been removed from the input text string and has been replaced by a different word in the at least one additional input text string.

17. The non-transitory computer readable storage medium of claim 15, wherein eliminating at least one of the input text string and the at least one additional input text string comprises determining which is a longer input text string.

18. The non-transitory computer readable storage medium of claim 17, wherein eliminating at least one of the input text string and the at least one additional input text string comprises eliminating that which is a longer input text string among the input text string and the at least one additional input text string.

19. The non-transitory computer readable storage medium of claim 15, wherein if the input text string and the at least one additional input text string do not share a common pre-assigned tag identifier stored in the memory location, then maintaining the input text string and the at least one additional input text string in the natural language grammar.

20. The non-transitory computer readable storage medium of claim 19, wherein maintaining the input text string and the at least one additional input text string in the natural language grammar is performed by writing both the input text string and at least one additional input text string to a source code stored in the memory location.

* * * * *